Dec. 1, 1959    H. M. CROSSWHITE, JR., ET AL    2,914,987
SLIT MECHANISMS
Filed June 3, 1954      5 Sheets-Sheet 1
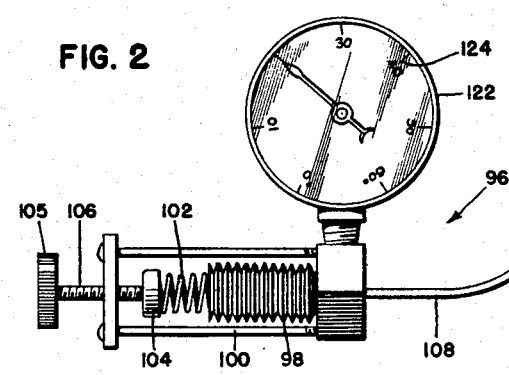
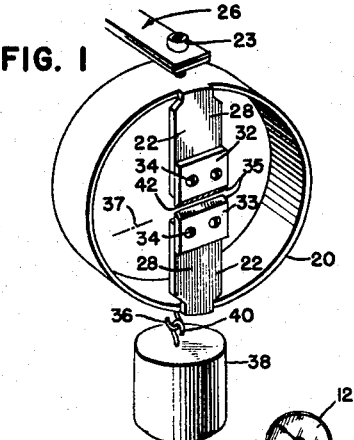
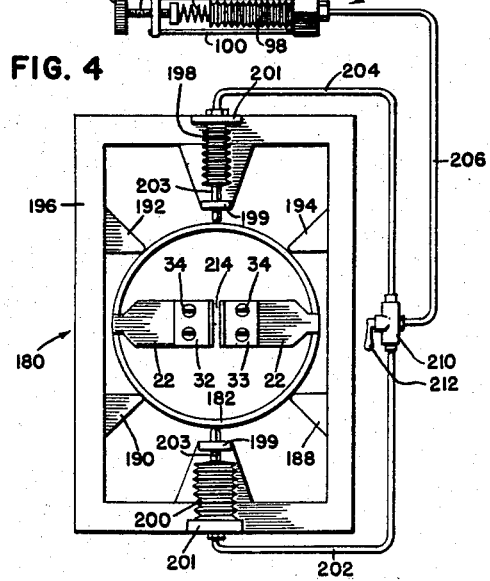
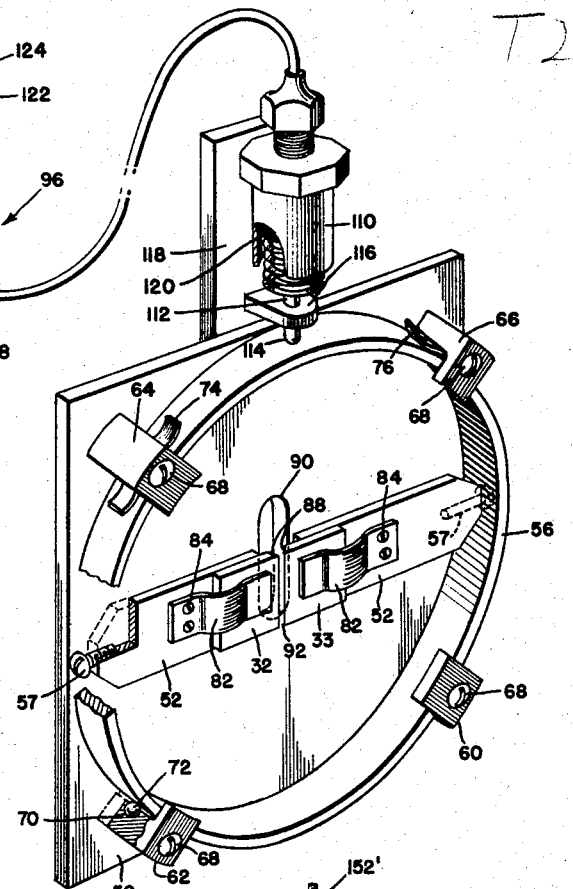
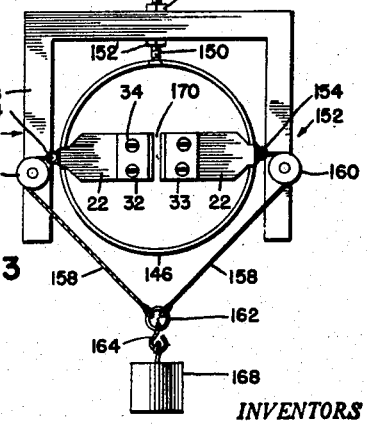
INVENTORS
Henry M. Crosswhite, Jr.
BY William G. Fastie
Walter G. Finch
ATTORNEY Dec. 1, 1959  H. M. CROSSWHITE, JR., ET AL  2,914,987
SLIT MECHANISMS
Filed June 3, 1954  5 Sheets-Sheet 2
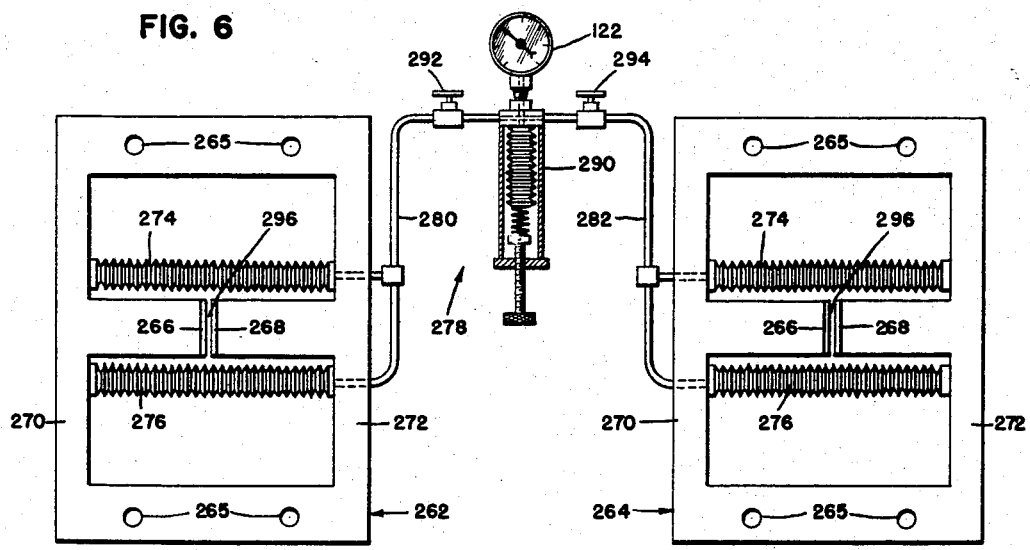
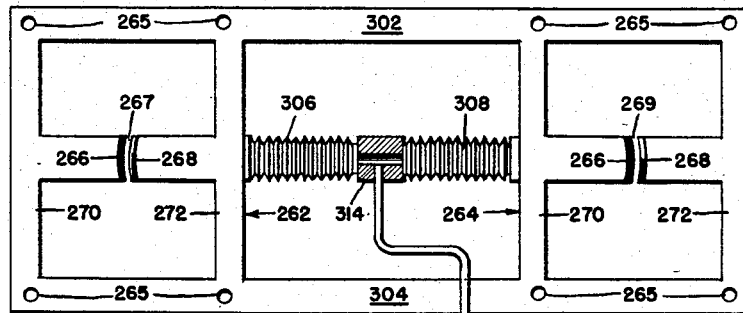
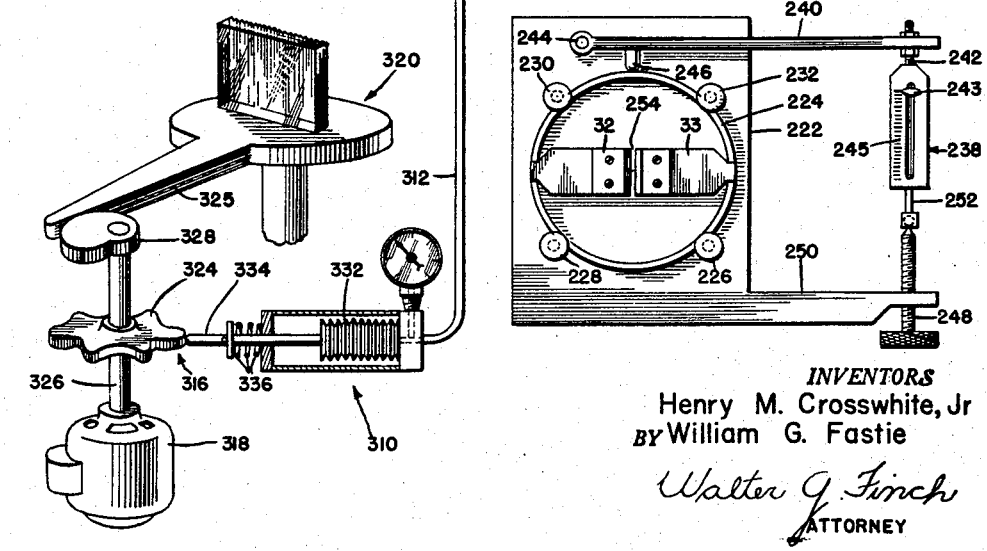
INVENTORS
Henry M. Crosswhite, Jr
BY William G. Fastie
Walter J. Finch
ATTORNEY

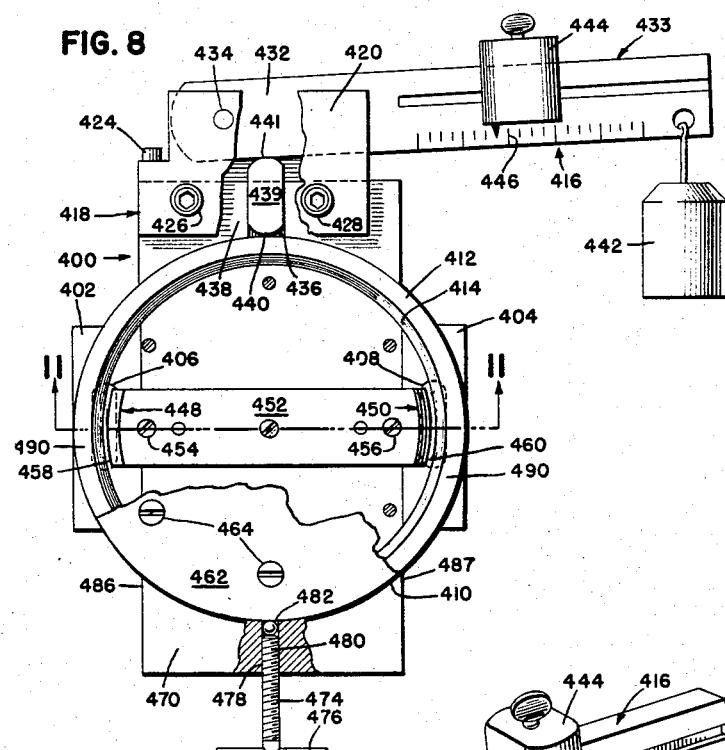

Dec. 1, 1959     H. M. CROSSWHITE, JR., ET AL     2,914,987
SLIT MECHANISMS
Filed June 3, 1954                                5 Sheets-Sheet 4
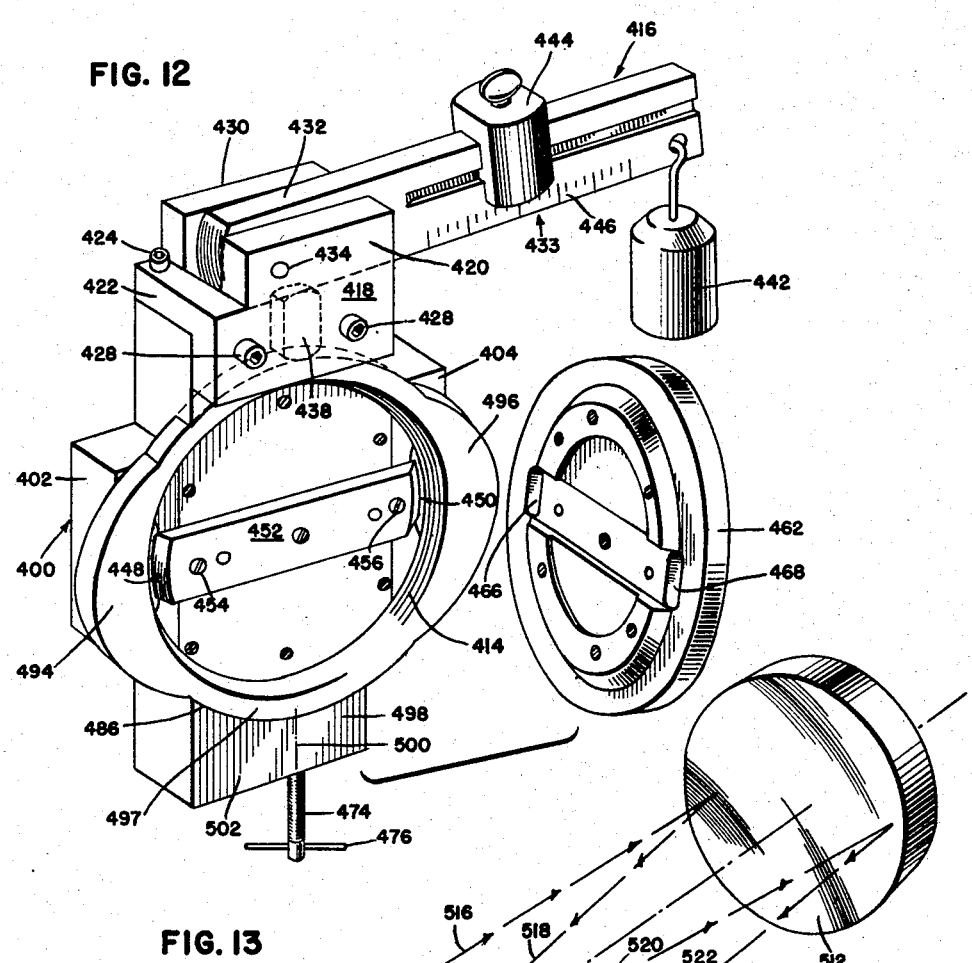
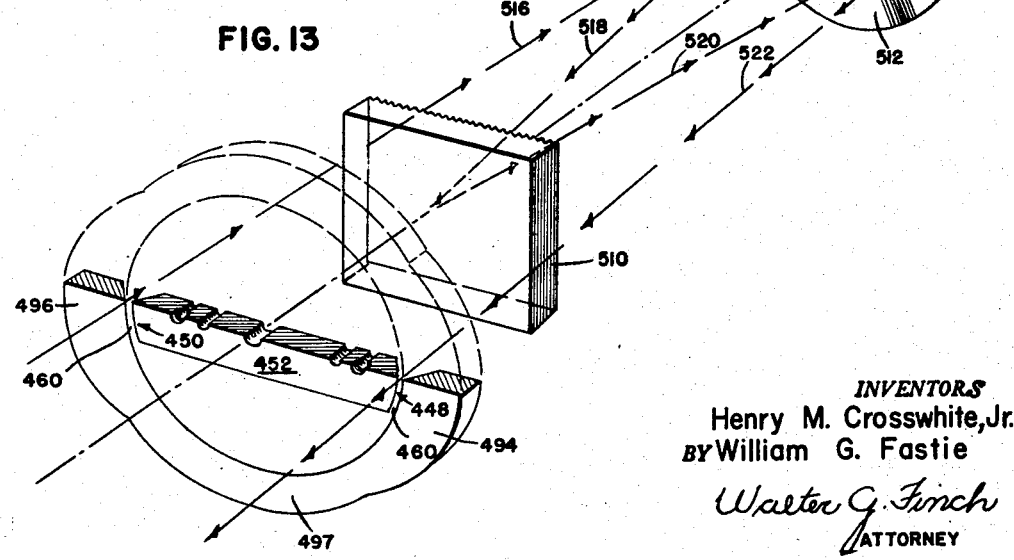
INVENTORS
Henry M. Crosswhite, Jr.
BY William G. Fastie
Walter G. Finch
ATTORNEY INVENTORS
Henry M. Crosswhite, Jr.
BY William G. Fastie

United States Patent Office 2,914,987
Patented Dec. 1, 1959

2,914,987

SLIT MECHANISMS

Henry M. Crosswhite, Jr., Mount Washington, and William G. Fastie, Owings Mills, Md., assignors of twenty percent to Walter G. Finch, Baltimore County, Md.

Application June 3, 1954, Serial No. 434,204

13 Claims. (Cl. 88—61)

This invention relates generally to spectroscopy, and more particularly to new and improved adjustable slit mechanisms for use in optical instruments such as spectroscopes, spectrophotometers, spectrographs, monochromators, and like optical instruments.

In spectrometric devices, it is necessary to provide long, narrow openings called slits through which light is allowed to enter and/or to leave the device. In many optical arrangements, it is desirable that the width of the slits be adjustable to an accurate value. And, in many instances, it is often desirable that the slit width be continuously varied in a predetermined way as the wavelength setting of the instrument is changed.

Slit adjustments may be of two types, that is, unilateral in which case one of the slit jaws is fixed and the other is movable; or bilateral and symmetrical in which case both slit jaws move symmetrically with respect to the line at which the slit jaws close.

In extreme cases, moreover, it is desirable to set the slit opening to an accuracy of one (1) micron (1/25000 inch) for any value of slit opening from two (2) to one hundred (100) microns or more, and/or to have the slit jaws remain parallel to an accuracy of one (1) micron. The edges of the slit jaws should, in extreme cases, remain coplanar to an accuracy of two (2) microns.

Most of the multiplicity of slit mechanisms or devices in current use in spectroscopic instruments employ precision ways or guides by which the slit jaws can be translated, together with a mechanical linkage connected to a micrometer drive for adjusting the slit jaws. The micrometer drive may be calibrated in terms of slit width, and/or may be coupled by a mechanical linkage including a pre-cut cam with the wavelength setting of the spectrometer. All of these systems are subject to wear between the moving parts, affecting the calibration, the degree of parallelism between the slit jaws, the backlash in the mechanical linkages, and the plane of the slit jaws.

Because of the close tolerances and the complexity of the mechanical linkages employed in these arrangements, it is usually not possible to change the slit opening as quickly as may be desired as, for example, in high speed scanning systems which produce oscillographic pictures of spectral intensity versus wavelength as often as one hundred (100) times per second.

Another disadvantage of conventional slit forming mechanisms is the inconvenience of reading the slit settings, the micrometer drive usually being located in close proximity to the slit forming assembly and often requiring a vernier reading because of the small value of the slit opening to be read. Still another material disadvantage of current slit mechanisms is their high cost of manufacture.

This invention overcomes the difficulties described above by providing a slit mechanism which is integral with the slit jaws and one which does not require positioning means or position measuring means associated with the slit jaws or with the slit mechanism, that is, the invention described hereinafter does not depend on a calibrated micrometer screw for positioning the slit jaws but rather on the strains produced in elastic members of a calibrated stress or load applied to the structure.

It is to be noted that some forms of conventional slits employ elastic members as springs or wire to retain the movable jaws against the micrometer, such as illustrated in the patent to A. A. Gradisar, No. 2,408,512, dated October 1, 1946. In the present invention, however, these members are conceived as massive structural members, the stress on the members being considered as the parameter which determines the slit opening. The applied stress may be then related to some gauge or device which is properly calibrated to indicate the corresponding width of the slit jaws.

In accordance with one form of this invention, the slit mechanism is composed of a precision ring of steel to which the slit jaws are attached. Such a ring will deflect an amount dependent on the load or stress applied to the ring and will assume a distorted shape which can be predetermined from the dimensions of the ring, Young's modulus of elasticity of the ring material and the fiber strength of the material, as will be subsequently explained in greater detail.

It is well known, moreover, that the displacement of any point on such a ring is proportional to the stress or load applied to the ring, and that there is a linear relationship between the load or stress applied and the displacement or strain produced. This relationship is known as Hooke's law.

This invention basically, therefore, comprises a mechanical structure to which a stress or load can be applied for the purpose of varying the opening between a pair of slit jaws which are an integral part of or rigidly connected to the structure. This mechanism is analogous to a proving or loading ring which is used for measuring loads on structures and which will be discussed more fully hereinafter.

It is an object of this invention to provide simplified slit mechanisms which meet severe dimensional tolerance requirements.

It is a further object of this invention to provide improved slit forming assemblies in which wear resulting from actuating the slit forming mechanism does not affect the accuracy of the slit setting.

Another object of this invention is to provide remote control means and setting indicators for slit forming assemblies.

It is still a further object of this invention to provide slit forming assemblies in which the slit settings are accurately adjusted by applying calibrated weights or loads to the assemblies.

Still even another object of this invention is to provide an arrangement for forming an adjustable slit in which the opening between the slit jaws varies in an amount which depends only on the magnitude of a load or stress applied to the arrangement, that is, in accordance with Hooke's law.

Still another object of the invention is to provide adjustable slit forming mechanisms which are absolutely free from backlash, play, or looseness in the slit jaw arrangements.

And another object of the invention is to provide a mechanism for adjusting highly precision circularly curved pairs of slits.

To provide a slit mechanism which is integral with the slit jaws and one which does not require positioning means or position measuring means associated with the slit jaws or with the slit mechanism, is still another object of this invention.

Other objects and many of the attendant advantages of this invention will be readily appreciated as the same becomes better understood by reference to the following detailed description when considered in conjunction with the accompanying drawings, and in which:

Fig. 1 is a perspective view, partly in elevation, showing one embodiment of the invention for providing a unilateral motion of the slit jaws;

Fig. 2 is a perspective view, illustrating a second embodiment of the invention, for providing a bilateral motion of the slit jaws;

Fig. 3 is an elevation view, illustrating a third embodiment of the invention, for providing a bilateral motion of the slit jaws;

Fig. 4 is an elevation view, illustrating a fourth embodiment of the invention, for providing a bilateral motion of the slit jaws;

Fig. 5 is an elevation view, of a fifth embodiment of the invention, for providing a bilateral motion of the slit jaws;

Fig. 6 is an elevation view of a sixth embodiment of the invention, for providing a pair of straight slits which can be bilaterally, symmetrically adjusted;

Fig. 7 is an elevation view, partly in perspective, of a seventh embodiment of the invention, for providing a pair of curved slits which can be unilaterally adjusted;

Fig. 8 is an elevation view of an eighth embodiment of the invention for providing a pair of curved slits which can be unilaterally adjusted;

Fig. 9 is a perspective view of the embodiment of the invention illustrated in Fig. 8;

Fig. 10 is a side view of the embodiment of the invention illustrated in Fig. 9;

Fig. 11 is a horizontal cross section taken along line 11—11 of Fig. 8;

Fig. 12 is a perspective view of a modification of the invention illustrated in Figs. 8 through 11, for providing a pair of unilateral adjustable curved slits;

Fig. 13 is a perspective view of parts of an Ebert monochromator, incorporating the embodiment of the invention illustrated in Figs. 8 through 11;

Figure 14:
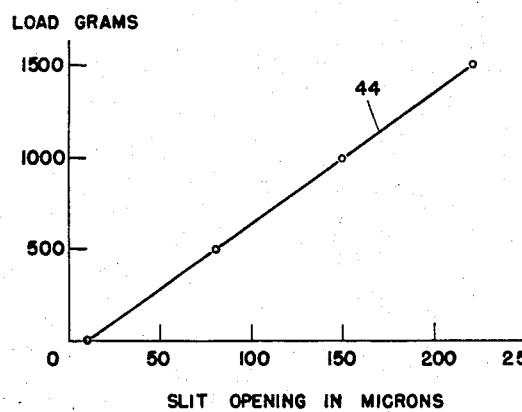
Fig. 14 is a calibration curve for the embodiment of the invention illustrated in Fig. 1.

In accordance with a simplified form of the invention, there is provided a pair of coplanar slit jaws with their edges being arranged parallel. Each of the slit jaws can be formed integral with or connected to diametrically opposite points of an elastic metal ring. An opening formed by the slit jaws can be varied by distorting the ring by suitable means, such as, for example, a weight or load placed on top of the ring, or by applying external pressure or stress to the ring. (Hereinafter, the words "stress," "pressure," "load," "force," and "weight" are used and imply their application to a system involving a consideration of Hooke's law, which states that the strain or elongation (extension) of a body produced by a stress is proportional to that stress.)

The pressure to adjust the slit opening may be applied through a hydraulic linkage arrangement, in which case the slit adjustment control can be located at a remote point from the slit forming mechanism. A pressure gauge associated with the hydraulic system and which may also be located at a remote distance from the slit mechanism can be utilized to measure the pressure or stress applied, and, therefore, the opening of the slit.

Several embodiments of the invention directed to unilaterally and bilaterally adjustable slit forming mechanisms are provided, which utilize either elastic ring or simple elastic beam structures. The slit jaws, in all of these mechanisms, can be formed integral with or connected to the elastic structure, or in some instances, the edges of the elastic structure can constitute the slit forming jaws.

For instance, in one preferred embodiment of the invention, applicable to those problems for which circularly curved slits are desired, a part of the inside edge of an elastic ring is one of the slit jaws, the other jaw having a circular edge and being mounted on the same base against which the elastic ring is retained.

Referring now to Fig. 1 of the drawings, there is illustrated an adjustable slit forming mechanism comprising an elastic metallic ring 20 which is preferably made of tool steel but which may be made from cast iron or low carbon steel. The flat plates 22 may be integral with ring 20 or they may be connected to ring 20 by suitable means. Ring 20 is rigidly connected to structural member 26 by means of the screw 23. Member 26 is formed integral with or connected to the main frame of the spectrograph or the optical instrument which the slit mechanism is to be used with.

The slit jaws 32 and 33 consist of flat plates of steel with bevelled edges 35. The line 37 of the slit jaw 33, for example, is defined as the intersection of the bevelled edge 35 and the surface of the slit jaw 33 which is in contact with the surface 28 of the plate 22. A similar line can be defined for jaw 32. The slit opening 42 is defined as the perpendicular distance between the lines 37 of the slit jaws 32 and 33.

Jaws 32 and 33 are retained against the surfaces 28 by means of screws 34 in oversize holes in the jaws 32 and 33. The oversized holes provide a means for adjusting the jaws 32 and 33 so that they are parallel. The jaws can be adjusted so that they are coplanar by bending the plates 22. In addition, ring 20 can be rotated by unscrewing screw 23 and then rotating the ring so that the slit jaws 32 and 33 are made parallel to the lines on the grating of the spectrograph and/or so the image of the entrance slit is parallel to the jaws of the exit slit.

A hook 36 is attached to the ring 20 to allow weights, such as a weight 38, to be hung therefrom by means of a hook member 40. Since ring 20 is elastic, known loads can be placed on the ring to obtain the desired opening of the slit 42 formed between the slit jaws 32 and 33, in accordance with Hooke's law. As previously pointed out, throughout this specification, a pressure or stress can be substituted for a weight or load. For example, wherever a weight is used, a spring load or the like can be substituted therefor. Thus a stress or pressure can be applied to the ring to obtain the same results above.

Ring 20, in one practical construction, was formed of cast iron approximately two and a quarter inches in diameter, with a thickness of one sixteenth of an inch and a width or depth of one quarter of an inch.

Ring 20 is analogous to proving or loading rings which are utilized for measuring loads on structures. A proving ring, in essence, consists of a precision ring of tool steel with two micrometer jaws for measuring the diameter of the ring. When a load is placed on the proving ring, it deflects and the micrometer head is a measure of the load applied. In the instant invention, however, the micrometer head is dispensed with. Adjustable jaws, which are fixed with respect to a point on the ring, are utilized as the slit jaws 32 and 33, as shown in Fig. 1, with known loads, as previously indicated, being placed on ring 20 to obtain the desired slit opening 42. The slit jaws are unilaterally adjustable, that is, only the lower slit jaw 33 can be moved as the load or weight 38 is applied to the ring 20.

In Fig. 14, there is illustrated a typical calibration curve 44 for the slit mechanism as shown in Fig. 1. This calibration curve 44 indicates that the slit opening 42 is a strictly linear function of the load 38, in accordance with Hooke's law. The slit mechanism was tested after having been loaded for six days with a 1500 gm. weight, and the identical curve illustrated in Fig. 14 was again obtained. These data and subsequent data that will be discussed are not intended to demonstrate the ultimate limit of reproducibility of the slit mechanism of Fig. 1. A traveling microscope with which the slit openings 42 were measured could be read to a limit of about one (1) micron.

As pointed out previously, the slit mechanism of Fig. 1 is unilaterally adjustable. This mechanism could be made bilaterally adjustable by rotating the mechanism through ninety (90) degrees in which case the slit jaws 32 and 33 move symmetrically when a load or pressure is applied to the ring. Bilaterally adjustable slit mechanisms of this type are illustrated in Figs. 2, 3, 4 and 5.

Referring first to Fig. 2, there is illustrated an elastic ring 56, which has flat plates 52 connected thereto by screws 57. This ring 56 is held against a flat base plate 58 by means of four retaining lugs 60, 62, 64 and 66.

These lugs 60, 62, 64 and 66 are secured to the base plate 58 by screws 68. The lower retaining lugs 60 and 62, each have a socket or recess 70 provided therein for receiving a ball 72, such as shown for lug 62. Thus, the elastic ring 56 rests against the balls 72 contained in the lower lugs 60 and 62. The upper lugs 64 and 66 have leaf springs 74 and 76 provided between them and the ring 56 to take up any loose movement between the lugs 60, 62, 64 and 66, and the ring 56. It will be pointed out subsequently how these four lugs 60, 62, 64 and 66 act as four nodal points for the ring 56, one of the important features of this invention.

Each slit jaw 32 or 33 is held securely against the flat metal plates 52 by leaf springs 82, which are, in turn, secured to the plates 52 by screws 84. The ends of plates 52 can be formed integral with the ring 56 or can be connected thereto by screws 57, which pass through the ring 56 and are screwed in threaded apertures in the ends of plates 52. A bevelled edge 88 is formed on each slit jaw 32 and 33.

The bevelled edges 88 of the slit jaws 32 and 33 are arranged parallel by adjusting each slit jaw, which, as previously pointed out, are maintained in position by leaf springs 82. It is, of course, realized that the flat metal plates 52 are adjusted to be coplanar. Base plate 58 has an aperture or opening 90 provided therein so that the radiation being studied and analyzed can be passed therethrough and through the slit opening 92 formed by slit jaws 32 and 33 and defined as indicated for the slit mechanism of Fig. 1. This base plate 58 is secured to a spectrometer body by any suitable means (not shown).

A hydraulically operated device 96 is utilized for applying a load, stress or pressure to the ring 56. This device 96 comprises a flexible bellows 98 contained in a framework 100. At one end of the bellows 98 there is located a compressed coiled spring 102, which, in turn, has its other end inserted in a cup 104. A screw operated mechanism 106, passing through a threaded aperture in the framework 100, is utilized to apply pressure against the coiled spring 102, which, in turn, applies pressure against the flexible bellows 98.

Bellows 98 is connected by a flexible tube 108 to a housing 110 having bellows 120 contained therein and a rod 112 connected thereto at its lower end. The other end 114 of the rod 112 rests against the elastic ring 56. This rod 112 is passed through a bearing plate 116 attached to a support 118, so that it can be maintained in proper operating position. A pressure gauge 122 having a graduated scale 124 is connected to and sealed to the tube 108 where the latter connects to the bellows 98. The pressure gauge 122, the bellows 98 and 120, as well as the tube 108 are filled with hydraulic fluid, such as oil.

In operation of the slit mechanism of Fig. 2, pressure is transmitted to the bellows 98 by adjusting the knob 105 of the screw mechanism 106. This causes the pressure in the closed system of the hydraulic mechanism 96 to be transmitted to the ring 56 by moving the rod 112, thus changing the slit opening 92, in accordance with the previously mentioned Hooke's law. The slit opening 92 is indicated on the pressure gauge 122. Any desired slit opening 92 can be obtained by changing the pressure on the hydraulic fluid. Pressure gauge 122 can be calibrated directly in terms of slit opening. Flexible tube 108 can be of any length, and the adjusting mechanism 96 can be located at any convenient position. By means of the arrangement described, the slit adjusting mechanism and pressure gauge indicating means 122 can be located at a remote position from the slit forming mechanism. This feature is particularly advantageous for vacuum types of spectrometers.

When the ring 56 of the slit mechanism is loaded as indicated, there are four points on the ring whose distance from the instantaneous center of the ring 56 is invariant. As noted, ring 56 is held in position by the four lugs 60, 62, 64 and 66, which are four nodal points. The load applied to the ring 56 is divided between the two bottom nodal points 60 and 62, with the result that under load, the bottom of the ring 56 moves upwardly, and the slit jaws 32 and 33 move bilaterally and without any downward motion. This type of arrangement is essential for a mechanism for forming pairs of circularly curved slits, which will be described subsequently with respect to Figs. 8 through 13.

Figure 15:
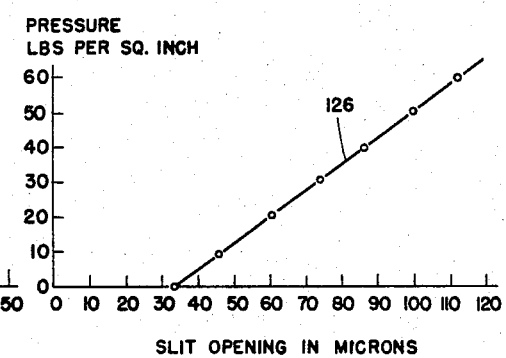
Fig. 15 is a calibration curve for the embodiment of the invention illustrated in Fig. 2.

Ring 56, in one practical construction, has a diameter of four inches, a thickness of ⅛ inch and a depth or length of ⁵⁄₁₆, and it was formed of cold rolled steel, although a tool steel is preferred. Its performance characteristics are illustrated in Fig. 15. As for the arrangement of Fig. 1, the calibration curve 126 is strictly linear. The maximum error in the reading for a large number of settings was two (2) microns. The center point of the slit jaws 32 and 33 was invariant to two (2) microns.

In Fig. 3 there is illustrated another embodiment of the invention for obtaining a bilaterally symmetrical slit forming mechanism. This arrangement is quite similar to that illustrated in Fig. 1, except that the slit jaws 32 and 33 are rotated ninety (90) degrees from the position shown in Fig. 1. Elastic ring 146 corresponds to the elastic ring 20 of the embodiment of the invention previously discussed, except that it is attached to and supported by a spectrometer body 148 by means of a screw or bolt 150, spaced ninety (90) degrees from the points 152 where the slit jaws 32 and 33 are fixed to the ring 146. Locknuts 152' are utilized to keep the bolt 150 in proper position. Small rings 154 are attached to the elastic ring 146 for receiving the corresponding ends of rope or cable members 158 which pass over pulleys 160, the corresponding opposite ends thereof being attached to a further ring 162. Ring 162 has a hook 164 provided thereon for receiving a weight holder and a weight, such as 168. Thus, by placing different weights on the hook 164, the load is varied, causing the slit opening 170 to vary in accordance with the load applied, as pointed out for the previously described embodiments of Figs. 1 and 2. Slit jaws 32 and 33, therefore, are adjustable bilaterally and symmetrically, since both of the jaws move simultaneously and uniformly.

In Fig. 4, there is illustrated an adjustable slit mechanism having an elastic ring 182 and slit jaws 32 and 33 corresponding to the previously described slit mechanisms. This mechanism is supported by lugs 188, 190, 192 and 194, provided in a simple elastic beam structure 196. These lugs, which support the ring 182, correspond to the previously described four nodal points for the slit mechanism shown in Fig. 2.

Flexible type bellows 198 and 200, connected to a hydraulic system, can be provided for applying a load or loads to the elastic ring 182. These bellows 198 and 200 can be of identical dimensions, or one can be of larger size than the other. In Fig. 4, bellows 200 is shown larger than bellows 198. These bellows are located between bearing plates 199 and 201 extending from the beam structure 196. Piston rods 203 pass through apertures in bearing plates 199, and press against the ring 182. These bellows are connected to the flexible branch tubes 202 and 204 leading from the main flexible tube 206, which, in turn, is connected to the pressure applying and indicating mechanism 208. Tube 206 and the pressure applying indicating mechanism 208 correspond to tube 108 and the hydraulically operated device 96, of Fig. 2, respectively.

A two way valve 210 operated by a stopcock 212 can be connected at the juncture of tubes 202, 204 and 206, for controlling the hydraulic fluid to either bellows 198 or 200. It is to be pointed out, therefore, that in utilizing the slit mechanism of Fig. 4 with different size bellows, only one bellows is utilized at a time. This is accomplished by connecting the two way valve 210 to the bellows that is to be used. A suitable cover can be provided over the simple beam structure 196 to hold the ring 182 in proper operating position. This is another important feature of this invention.

By applying pressure to the closed hydraulic system, the ring 182 is loaded either by bellows 198 or 200, to bilaterally adjust the slit opening 214 formed by the slit jaws 32 and 33. When the small bellows 198 is used a full scale reading on the pressure gauge 122 may provide only one-fifth (⅕) the slit opening 214 as would be provided if bellows 200 were employed, or any desired ratio of slit opening 214 may be obtained by properly choosing the relative dimensions of the bellows 198 and 200.

The embodiment of the invention illustrated in Fig. 5 is likewise utilized for forming a bilaterally adjustable slit mechanism. This mechanism includes a base plate 222 having an elastic metallic ring 224 maintained thereon by four lugs 226, 228, 230 and 232, secured to the plate 222. Slit jaws 32 and 33 are provided as previsously described for the slit mechanisms of Figs. 1, 3 and 4. In this mechanism, instead of using a weight or a hydraulically operated mechanism for loading the ring 224, a spring scale 238 is attached to an arm 240 by a screw or bolt 242. Arm 240 is pivotally mounted on the base plate 222 by a pin 244. A lug 246 extends from the arm 240 and engages the ring 224 so as to apply pressure thereto when a load or force is placed on the spring scale 238.

Spring scale 238 is adjusted by means of an adjusting screw 248, which passes through an aperture provided in an arm 250 extending from the base plate 222. Screw 248 is attached to the scale arm 252. The dimension of the elastic ring 224 can be adjusted so that sixteen (16) microns correspond to a reading of one (1) pound, as indicated by the pointer 243 on the graduated scale face 245, or by choosing the dimensions of the ring 224 and the strength of the spring, any desired relationship between slit opening 254 and scale reading 245 can be obtained. Thus, by applying a load to the spring scale 238, the arm 240 moves downwardly to cause lug 246 to deflect the ring 224, causing the slit opening 254, formed by the slit jaws 32 and 33, to vary linearly in an amount which depends only on the magnitude of the load applied to the spring scale 238 and in accordance with the previously described Hooke's law slit mechanisms. It is to be noted that this slit mechanism, like all of the previously described mechanisms of Figs. 1 to 4, is absolutely free from backlash, play, or looseness in the arrangement of the component parts.

The choice of the ring dimensions and materials for the embodiments of the invention illustrated in Figs. 1 through 5 can be computed by utilizing formulas for the deflection of a ring under load. The deflection of a ring of rectangular cross section is given by Hooke's law in a suitable form:

$$\Delta d = \frac{.225 P d^3}{E b t^3} \qquad \text{Eq. (1)}$$

where $P$ is the load in pounds, $d$ is the mean diameter of the ring, $E$ is Young's Modulus of Elasticity, $b$ is the width of the ring, $t$ is the thickness of the ring, and $\Delta d$ is the change in diameter of the ring along the line at which the pressure is applied.

The maximum deflection that is allowed for a ring without exceeding the elastic limit of the material is given by:

$$\Delta d_m = \frac{.25 F d^2}{E t} \qquad \text{Eq. (2)}$$

where the new symbol $F$ is the fiber strength of the material being used.

On applying Equation 2 to a small cast iron ring two and a quarter (2¼) inches in diameter, one sixteenth (¹⁄₁₆) inch thick, and one quarter (¼) inch wide, as illustrated in Fig. 1, the maximum slit opening allowable is calculated as .4 mm. If, however, the ring had been made of tool steel instead of cast iron for which Young's Modulus of Elasticity is the same but in which the fiber strength is ten times larger, the range of allowable slit opening would have been 4 mm.

It is to be particularly noted that the maximum deflection allowed is independent of the width of the ring so that the width parameter can be used to acquire mechanical stability of the ring without limiting the range of the slit. It is also to be emphasized that any dimension of the ring can be adjusted to obtain an integral relationship between the slit opening and the load applied.

An elastic ring slit mechanism is not the only structure which can be utilized for forming adjustable slits. In fact, any elastic structure can be utilized. In Figs. 6 and 7 there are illustrated, for example, such slit mechanisms for obtaining pairs of bilateral, symmetrical straight or curved slits.

In Figs. 6, the slit mechanism comprises two simple and identical elastic beam structures 262 and 264, of rectangular shape, each having pairs of slit jaws 266 and 268, formed integral therewith. These beam structures can be attached to the spectrometer body by bolts passing through the apertures 265. Each beam structure 262 or 264 consists of two parallel spaced leg portions 270 and 272, with two identical flexible bellows 274 and 276 located therebetween, as indicated, or the pair of bellows in one beam structure, such as 264 can be made either larger or smaller than the pair of bellows in the other beam structure to provide an $x$ to 1 ratio of slit openings 296. These bellows 274 and 276 have their ends attached to the leg portions 270 and 272 by suitable means.

A hydraulic system 278 having flexible tubes 280 and 282 are connected to an adjusting and indicating mechanism 290, as previously described for the embodiments of the invention shown in Figs. 2 and 4. Cutoff valves 292 and 294 can be provided in tubes 280 and 282, respectively, and can be operated independently so as to allow independent adjustment of either pair of slit jaws 266 and 268. Thus by applying pressure from the single hydraulic system 278, the leg portions 270 and 272 are pushed apart to vary the slit openings 296 formed by the slit jaws 266 and 268. Slit jaws 266 and 268, although shown as single flat plates, can be made similar to slit jaws 32 and 33 shown in the other embodiments of the mechanisms illustrated in Figs. 1 through 5. Also curved slit jaws may be substituted for the straight slit jaws 266 and 268.

The embodiment of the slit mechanism illustrated in Fig. 7 is similar to that shown in Fig. 6, except that the elastic beam structures 262 and 264 are connected together as one integral structure by means of the beam members 302 and 304. Instead of utilizing four bellows, as shown for the slit mechanism of Fig. 6, two bellows 306 and 308 are connected to the previously mentioned hydraulic operated adjusting and indicating mechanism 310 by a flexible tube 312 and a manifold 314. The bellows may be of different sizes to provide an $x$ to 1 ratio of slit openings 267 and 269. The pairs of slit jaws 266 and 268, instead of being bilaterally adjustable, are unilaterally adjustable since the bellows 306 and 308 exert pressure only against the inner leg portions of the beam structures.

One of the possible uses of the slit mechanism illustrated in Fig. 7 is to spectrophotometry, where a mechanical linkage 316 is required between the motor drive 318 for the dispersing element 320 and the slit mechanism. The hydraulic linkage illustrated appears to be simpler than the presently employed mechanical systems. The hydraulic system can be arranged to cooperate with a cam 324 of the desired shape located on the drive shaft 326 from the motor drive 318 to the pivotally mounted table or platform 325 upon which the dispersing element 320 is mounted. A second cam 328 can be fastened to shaft 326 for operating the dispersing element 320 at the desired rate. Cam 324 maintains contact with the bellows 332 of the adjusting and indicating device 310 by means of the rod member 334 mounted thereon and biased by spring 336.

Another application of the slit mechanisms, such as illustrated in Figs. 1 through 7, is to high speed spectrometry because the ring slit mechanism can be designed to respond sufficiently fast to provide a constant intensity spectrum for cathode ray presentation.

Figs. 8 through 11 illustrate a preferred embodiment of a slit mechanism for obtaining a pair of curved slits, one for the entrance beam and the other for the exit rays, for an Ebert monochromator system such as illustrated in Fig. 13 and other monochromator optical systems. Slits of this type as illustrated in Figs. 8 through 11 were designed for a thirty inch (30") focal length Ebert system employing a plane grating on which there were 3" of ruled lines 2½" long with 30,000 lines to the inch. The slits utilized in a system of this type are one inch (1") long and lie on the same four inch (4") diameter circle.

The slit mechanism of Figs. 8 through 11 comprises a brass body or block 400 having two side portions 402 and 404 that extend outwardly therefrom, as best illustrated in Figs. 8 and 9. As shown in Figs. 8 and 11, these side portions 402 and 404 have elongated apertures or slots 406 and 408 formed therein for the passage of the radiation being analyzed or studied in the Ebert system. A recess 410, best seen in Fig. 10, is machined in the brass block 400 for receiving a flexible ring 412. The ring 412 is arranged in the recess 410 for a free but not a loose fit.

At the upper part of the block 400, there is provided a lever weight system 416 for applying pressure or a load to the ring 412. A fixed metal member 418, as shown in in Figs. 8, 9 and 10, having upwardly extending portions 420 and 430 and a side portion 422, is fastened to the block 400 by Allen head screws 424, 426 and 428. Portion 420, it is to be noted, is spaced from portion 430, and is located above but laterally spaced from the ring 412.

One end 432 of a lever 433 of the weight system 416 is pivotally mounted between the spaced metal portions 420 and 430 by means of a pivot pin 434. A recess 436 is provided in portion 438 of the block 400, as shown in Figs. 8 and 10, for receiving a floating member 439, which has its lower end 440 as best seen in Fig. 8 in contact with the flexible ring 412 and its upper end 441 in contact with the end 432 of the lever or scale 433. Known weights, such as weight 442 can be placed on the lever 433, or a fixed weight, such as weight 444 can be moved along a calibrated scale 446.

The inner jaws 448 and 450 of the slit mechanism are formed on a 1" section 452 of a 4" circular plate. To eliminate end effects, the complete circle was ground to match the diameter of the ring 412, but, however, after first sawing and machining the section 452 to be used. The section 452, forming the inner jaws 448 and 450, is carefully centered on the ring 412 and is then bolted to the brass block 400 by bolts or screws 454 and 456. Thus the inner jaws 448 and 450, together with the bevelled edge 414, used as the outer slit jaws, form two circular slit openings 458 and 460.

Warping of the ring 412 is prevented by a cover plate 462 carefully machined to give a close fit with the ring 412 without binding and to keep all of the slit jaws coplanar. This cover plate 462 is secured to the brass block 400 by six screws, such as 464. The cover plate 462 also has two elongated apertures 466 and 468 formed therein and in alignment with the apertures 406 and 408 in the brass block for the passage of the radiation being analyzed.

In the lower portion 470 of block 400, there may be provided a second means for applying a load or pressure to the flexible ring 412. This means comprises a screw 474 having a handle 476 thereon for moving the screw. This screw 474 is received by a threaded opening 478, with the opening 478 being located directly below the ring 412. The upper end 480 of screw 474 engages a ball or sphere 482, and the latter, in turn, contacts the ring 412.

Thus, the slit opening can be adjusted in two ways. For wide slits, or as a convenient stop to limit the minimum width thereof, the screw 474 can be used. For adjustments requiring greater precision, however, the weight and lever system 416 mentioned above can be used. The slit openings may be varied by weights in either of two ways, by hanging on known weights 442 on the end of the lever 433 or by moving the fixed weight 444 along the calibrated scale 446. If the pressure from above is greater than that from the screw 474, the thrust will be taken by the two lower corners 486 and 487, and the bottom 488 of the ring 412 will rise from the screw 474. The sides 490 of the ring 412 will move laterally, and without great distortion of their curvature over the one inch (1") section of the ring 412 that is used for the slit jaw.

Fig. 12 shows a slightly modified arrangement of the slit mechanism illustrated in Figs. 8 through 11. The main differences between the two mechanisms resides in the thickened portions 494 and 496 added to either side of the ring 497 to prevent distortion of the curvature of the ring in the vicinity of the outer slit jaws 490 when a load is applied thereto, and in the asymmetrical mounting of the flexible ring structure.

In spectrometric problems involving accurate intensity measurements of spectral lines, slit ratios something like two (2) to one (1) are generally used. This may be accomplished by asymmetrically mounting the flexible ring 497 on the brass block or base 400, as shown in Fig. 12, where the right lower portion 498 measured from the center line 500 of the block 400 is of less width than the left lower portion 502 of block 400.

Fig. 13 illustrates parts of an Ebert system showing the placement of a grating 510, mirror 512, and the slit mechanism of Fig. 12, with a symmetrical mounting of the flexible ring 497. Lines 516, 518, 520 and 522 are representative of the rays that pass through the entrance slit opening 458 and leave through the exit slit opening 460 of the Ebert system.

The procedure for forming the outer and inner jaws of the ring slit mechanism will now be discussed. To form the outer slit jaws, a cylindrical ring of the required dimensions is first machined from flat ground steel stock. A rough spherical concave bevel is then formed on the inner surface of the ring by any conventional machine shop procedure. The spherical concave bevel surface is then finished by optical grinding techniques utilizing a spherical ball and suitable grinding compounds. The transverse surface of the ring that intersects the spherical concave bevel is likewise finished to a flat surface by optical grinding techniques well known to those skilled in the art.

The inner jaws of the slit mechanism can be formed by cutting a circular disc from a flat plate with substantially the same diameter as the inner diameter of the previously formed outer slit jaw ring. A rough spherical convex surface is then formed on the periphery of the disc by machine shop procedure. The rough spherical convex bevel surface is then finished by optical grinding techniques utilizing a spherical concave surface.

The face of the disc which intersects with the spherical convex surface forming the inner jaws should likewise be finished to a flat surface by optical grinding techniques. A truncated strip of the required width is then obtained to form the inner slit jaws, such as illustrated by section 452 of Fig. 8.

It is to be pointed out that in ring type slit mechanisms which do not require small or close tolerances for the ring, the bevelled edges of the inner and outer jaws can be flat and formed at the desired angle.

It will be noted that in Figs. 8 and 9, the ring 412 when placed under a load, is contacted at the bottom only at the points 486 and 487, which are two of the four nodal points of the ring 412. Since these nodal points are fixed with respect to the inner slit jaws 448 and 450, the center point of the ring 412 does not move with respect to the center of curvature of the inner slit jaws 448 and 450, which as previously described, causes the side portions 490 of ring 412 to move laterally with respect to the inner jaws 448 and 450 and without any downward motion. Over the short sections of slit jaws normally used and for small values of slit openings in a spectrometer, the curvature of portions 490 of ring 412 do not vary significantly from that of the inner jaws 448 and 450. Even the slight change in curvature might result from loading the ring 412 of Fig. 8 can be completely removed by thickening the portions of the ring which are used as the outer slit jaws, as previously described and illustrated in Fig. 12, in which portions 494 and 496, which are used for the outer slit jaws, of the ring 497 are considerably thicker than the remainder of the ring 497, and therefore, do not change curvature when the ring 497 is loaded.

In this case, the nodal points of the ring are at different positions than for the symmetrical ring mounting of Fig. 8, but the condition of constancy of the center of the outer ring 497 is maintained. If the ring 412 of Fig. 8 had been supported at its bottom, as against the ball or sphere 482, then under load the ring 412 would distort and assume the shape it assumed when it rested against the nodal points 486 and 487. In this case, however, the center of gravity of the ring would have moved downwardly, and the ring portions 490 likewise would have moved downwardly. The slit openings between the inner and outer jaws would have become asymmetrical, whereas in the nodal point mounting actually shown in Fig. 8, the slit openings are symmetrical about the horizontal center of the ring system.

If the pair of slit openings of Fig. 8 were used as the entrance and exit slit openings of a monochromator in which the image of the entrance slit is formed erect or inverted, the monochromatic image of the entrance slit would coincide with the exit slit opening, provided, of course, the optical elements of the monochromator were in proper adjustment. There will emerge through the exit slit, radiation from which the spectral band width is uniform along the slit length.

In the case where the ring is not mounted at the nodal points, such as 486 and 487, but at the bottom, as against the ball 482, and the monochromator forms an erect image of the entrance slit, the monochromatic image of the entrance slit will coincide with and be identical to the exit slit. However, since the entrance and exit slits are asymmetrical, a uniform spectral band width will not be presented to the exit slit. Furthermore, if the spectrometer forms an inverted image of the entrance slit on the exit slit, as in the case of the Ebert monochromator, then it can be seen that the monochromatic image of the entrance slit, being inverted, does not coincide with the exit slit, it being too wide at the top and too narrow at the bottom, with the result that some of the monochromatic energy from the entrance slit is lost.

Another consequence of this mismatch of the entrance slit image with the exit slit is that unwanted radiation of another wavelength, which may exist in the radiation being studied, will reach the exit slit, resulting in further impurity of the radiation leaving the exit slit.

It can be seen, therefore, that the nodal point mounting of the slit forming ring as illustrated in Fig. 8 provides higher spectral purity than can be obtained by asymmetrical mountings of the ring mechanism, and that thickening the slit jaws of the outer ring, that is the portions 494 and 496, as illustrated in Fig. 12, results in further purification of the spectral band emerging from the exit slit.

The degree of reproducibility which can be obtained with slit mechanisms of the type described hereinafter has already been partially described. The slit mechanism of Fig. 8 which has been constructed for a 30" focal length Ebert monochromator and with which the spectral performance shown in Fig. 16 has been obtained, as shown by the larger or higher peaked curve illustrated, was also used to demonstrate the high degree of reproducibility which the mechanism is ultimately capable of obtaining. When the ring 412 was in the unloaded position, that is without the weights 444 and 442 applied to the balance or lever arm 443, the slit opening observed was about one (1) micron plus or minus one-half (½) micron. When a two (2) pound load was applied to the end of the lever 443, the opening was three times the opening under no load. Under repeated test, the position under load was reproducible to a limit of less than one tenth (.1) micron, that is, if the loaded and unloaded positions were three (3) microns and one (1) micron, respectively, the opening under a two (2) pound load varied by less than one tenth (.1) micron. Under no load the variation was much less, indicating that at least part of the error of reproducibility was associated with the loading mechanism. However, the reproducibility observed is much better than required for almost any spectrographic application and is at least an order of magnitude better than previously described mechanisms.

As has been pointed out in a copending patent application by one of the inventors, that is, William G. Fastie, Serial No. 241,194, filed August 10, 1951, the use of circularly curved slits in the Ebert monochromator and in other types of monochromators allows the use of much longer slits than would otherwise be allowed, thus making available more energy for actuating phototubes, photocells, and other light detectors which are employed to measure the energy from a monochromator.

As previously mentioned, a slit mechanism of the type shown in Figs. 8 through 11 has been built for an Ebert monochromator of 30" focal length, the diameter of the slit circle being 4". Tests of the system indicate that the entire length of the slit can be used with only a slight reduction in the spectral resolving power obtained with very short slits. This reduction in spectral resolution is caused by either slight imperfections in the slit jaws or very slight misalignment of the slit jaws with other components of the spectrometer. For extreme cases, however, in which the light signal to be measured is very weak, the increase in signal occasioned by the long slits far outweighs the slight loss in resolution. This effect is illustrated in Fig. 16.

Figure 16:
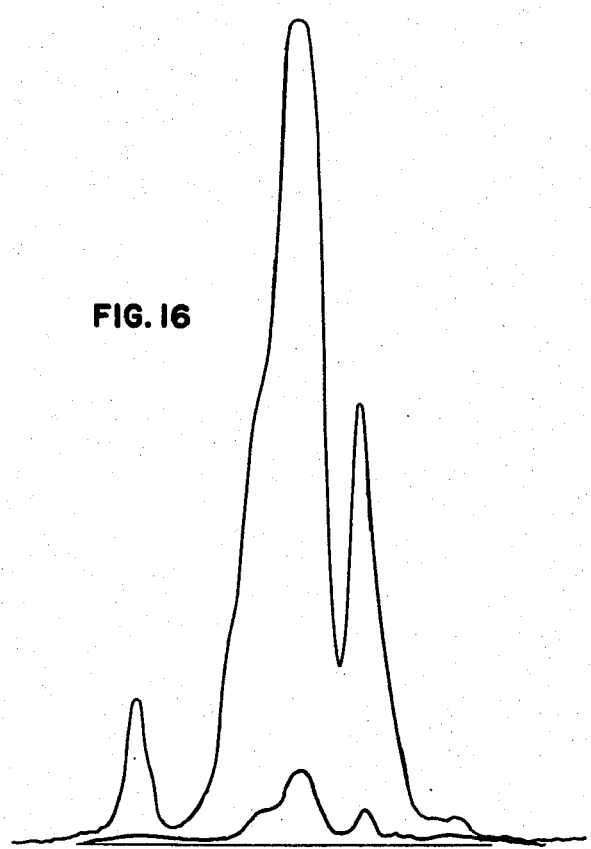
Fig. 16 illustrates intensity curves for the embodiment of the invention illustrated in Figs. 8 through 11.

The small curve of Fig. 16 shows the spectrum which is obtained by a very short slit such as is required when straight slits are used in an Ebert monochromator. The upper or larger curve of Fig. 16 shows the spectrum which was obtained utilizing the entire one inch length of the slits shown in Figs. 8 through 11. The signal increase of about ten (10) fold with insignificant loss in spectral resolution demonstrates the importance of the very high precision curved slit mechanisms which have been described. If straight slits one (1) inch long had been used for the test and as shown for the higher curve in Fig. 16, the entire structure in the section of the spectrum shown would have been completely eliminated, that is, the spectrum would have appeared as a broad single line without any structural detail.

As described in copending application Serial No. 241,194, now Patent No. 2,757,568, there is no limit to the length of slit which can be used in an Ebert monochromator, that is, an entire semicircle can be used for an entrance slit, and the remaining semicircle used for an exit slit. However, as mentioned previously, a ring, such as 412, under distortion will have four (4) points on the ring 412 which remain fixed with respect to the instantaneous center of the ring when a series of loads are used.

In a nodal point mounting, such as shown in Fig. 8, the section or member 452 which forms the inner slit jaws 448 and 450 must be limited in width to the distance between the nodal points in order that the distorted outer ring 412 does not jam on the inner slit jaws 448 and 450. In a symmetrical ring, such as ring 412 of Fig. 8, the nodal points are at about 90° to each other on the ring surface, which restricts the slit jaws to about one-half (½) the length of the semicircle. For the asymmetrically mounted ring 497 of Fig. 12, the nodal points on each slit section are separated by much more than 90° of arc, depending on the extent of the thickened sections 494 or 496, thus allowing use of a greater length of the slit jaws.

As can be seen from an analysis of the grating equation $$n\lambda = a(\sin \alpha + \sin \beta) \quad \text{Eq. (3)}$$

where the symbol $n$ represents the order number, $\lambda$ is the wavelength of the radiation, $a$ is a grating constant, $\alpha$ is the angle between the radiation incident on the center of the grating and a line which is perpendicular to the face of the grating at its center, and $\beta$ is the angle between the diffracted or dispersed rays and the grating normal, the average wavelength emergent from the exit slit is substantially independent of the slit opening, even if both slits are unilateral, provided the proper jaws are moved. If one jaw of the entrance slit is moved so that $\alpha$ increases and, at the same time, one jaw of the exit slit moves the same amount so that $\beta$ also increases, the wavelength increases $$\lambda_1 = a/n \; [\sin \; (\alpha + \Delta) + \sin \; (\beta + \Delta)] \quad \text{Eq. (4)}$$

However, if the other jaw of the exit slot moves, the equation becomes $$\lambda_2 = a/n \; [\sin \; (\alpha + \Delta) + \sin \; (\beta - \Delta)] \quad \text{Eq. (5)}$$

When $\alpha$ and $\beta$ are small and of approximately the same magnitude, as in an Ebert system, the value of $\lambda_2$ is substantial invariant as $\Delta$ varies (i.e. the slit width), whereas $\lambda_2$ changes markedly as $\Delta$ changes.

This result can be stated as follows: if the image of the fixed entrance slit jaw falls on the fixed exit slit jaw, the wavelength variation caused by opening the slits a like amount is minimized.

The pairs of cooperating unilateral slits as shown in Figs. 6 through 13, when employed in an Ebert system and other grating spectrometer optical systems, therefore, provide relatively constant wavelength as both the entrance and exit slits are varied.

Obviously many modifications and variations of the present invention are possible in the light of the above teachings. It is therefore to be understood that within the scope of the appended claims the invention may be practiced otherwise than as specifically described.

What is claimed:

1. A slit mechanism, comprising, elastic ring structure, at least one pair of slit elements secured to said ring structure, the edges of each of said slit elements being defined as a line which is the intersection of one surface of said slit element with an inclined face of said slit element so that the angle between said surface and face is acute, a given load, said elastic ring being deflectable a given amount under said given load in accordance with Hooke's law, means including a linkage between said load and ring for applying said given load to said ring to vary openings formed by said slit elements, and means for providing nodal point mounting of said ring at at least two points, the pressure resulting from the deflection of said ring structure being distributed to said nodal points.

2. An arrangement as set forth in claim 1, and means for providing asymmetrical mounting of said ring.

3. An arrangement as set forth in claim 1, said ring having thickened portions associated with said slit elements to provide openings of constant width when said ring is deflected.

4. A slit mechanism, comprising, an elastic, perimetral type structure, at least one pair of coplanar slit jaws, at least one of said slit jaws being attached to said elastic structure, the edges of each of said slit jaws being defined as a line which is the intersection of one surface of said slit jaw with an inclined face of said slit jaw so that the angle between said surface and face is acute, means for adjusting said slit jaws to render the edges of said slit jaws parallel, means for adjusting said slit jaws to render them coplanar, a given load, at least a portion of said structure being deflectable under said given load, and means including at least a linkage between said given load and deflectable portion of said structure for applying said given load to said deflectable portion of said structure to vary an opening formed between said slit jaws, said deflectable portion of said structure being free to position said load applying means in accordance with the Hooke's law relationship applicable to said deflectable portion of said structure so that said opening formed between said slit jaws varies in direct relationship with said load.

5. An adjustable slit mechanism, comprising, an elastic ring structure, at least one pair of coplanar slit jaws, at least one of said slit jaws being secured to said elastic ring structure, the edges of each of said slit jaws being defined as a line which is the intersection of one surface of said slit jaw with an inclined face of said slit jaw so that the angle between said surface and face is acute, means for adjusting said slit jaws to render the edges of said slit jaws parallel, means for adjusting said slit jaws to render them coplanar, a given load, and means including at least a mechanical linkage between said given load and said elastic ring for applying said given load to said ring structure to vary an opening formed between said slit jaws, said ring structure being free to position said load applying means in accordance with the Hooke's law relationship applicable to said structure, with said opening formed between said slit jaws varying direct relationship with said load.

6. In combination with a spectrometric device, a slit mechanism including an elastic ring structure, at least one pair of coplanar slit jaws located in the focal plane of said device, at least one of said slit jaws being secured to said elastic ring structure, the edges of each of said slit jaws being defined as a line which is the intersection of one surface of said slit jaw with an inclined face of said slit jaw so that the angle between said surface and face is acute, means for adjusting said slit jaws to render the edges thereof parallel, other means for adjusting said slit jaws to render them coplanar, a given load, and means including a linkage between said load and elastic ring structure for applying said load to said elastic ring structure to vary an opening formed between said slit jaws, said elastic ring structure being free to position said load applying means in accordance with the Hooke's law relationship applicable to said elastic ring structure.

7. A device for spectrometric slits, comprising, ring structure at least a part of which is elastic, said structure being so dimensioned and of such material that it does not take a permanent set as a result of the deflections to which said ring structure is subjected, a pair of slit jaws secured to said ring structure and arranged to form an opening between said slit jaws, said opening being located substantially in a geometric plane, the edges of each of said slit jaws being defined as a line which is the intersection of one surface of the slit jaw with an inclined face of the slit jaw so that the angle between said surface and face is acute, at least one of said slit jaws being formed integral with said structure, said slit jaws being movable in such a way that the plane of said opening is invariant, and means including a linkage for applying a known load to the deflectable, elastic part of said ring structure to vary said opening between said slit jaws, said elastic part of said ring structure being free to position said load applying means in accordance with the Hooke's law relationship applicable to said deflectable portion of said ring structure, with the opening formed between said slit jaws varying in direct relationship with said load.

8. A slit mechanism comprising, a ring structure, at least two coplanar slit jaws, at least one of said slit jaws being integrally secured to said ring structure, the edges of each of said slit jaws being defined as a line which is the intersection of one surface of said slit jaw with an inclined face of said slit jaw so that the angle between said surface and face is acute, means for adjusting said slit jaws so that the edges thereof are parallel, a load, means including a mechanical linkage for applying said load to said ring structure to vary an opening formed between said slit jaws, and means for directing light through said opening between said slit jaws, said opening being measured by the known magnitude of a load applied to said ring structure and the known dimensions and materials of construction of said ring structure according to the Hooke's law relationship applicable to said ring structure.

9. A slit mechanism for use in a spectrometric optical system having at least one focal plane, comprising, an elastic ring structure, a pair of slit jaws, said slit jaws being arranged to be positioned in said focal plane, at least one of said slit jaws being attached to said elastic ring structure, means for adjusting said slit jaws to render them parallel, means for adjusting said slit jaws to render them coplanar, means for applying a load to said elastic ring structure to move said one slit jaw of said pair of slit jaws perpendicular to the edge of said slit jaw and in said focal plane, and means for determining the magnitude of said load, whereby the opening between said pair of slit jaws can be ascertained from a previously determined proportionality constant in the linear relationship between the magnitude of the load applied to said elastic ring structure and the distance moved by said one slit jaw.

10. A slit mechanism, comprising an elastic perimetral type structure, two pairs of coplanar slit jaws, at least one of the slit jaws of each pair of slit jaws being secured to said elastic structure, the edges of each of the slit jaws being defined as a line which is the intersection of one surface of that slit jaw with an inclined face of the same slit jaw so that the angle between said surface and face is acute, means for adjusting said slit jaws to render the edges of each pair of slit jaws parallel to each other, means for adjusting said pairs of slit jaws to render them coplanar, a given load, at least a portion of said structure being deflectable under said given load, and means including at least a linkage between said given load and deflectable portion of said structure for applying said given load to said deflectable portion of said structure to vary openings formed between said pairs of slit jaws, said deflectable portion of said structure being free to position said load applying means in accordance with the Hooke's law relationship applicable to said deflectable portion of said structure so that said openings formed between said pairs of slit jaws vary in direct relationship with said load.

11. A slit mechanism as recited in claim 10, and means for providing nodal point mounting of said elastic, perimetral type structure at at least two points, the pressure resulting from the deflection of said elastic structure being distributed to said nodal points.

12. A slit mechanism as recited in claim 10, and means for providing asymmetrical mounting of said elastic, perimetral type structure at two points of support so that the pressure resulting from the deflection of said elastic, perimetral type structure is distributed between said points of support to provide a desired ratio of slit openings between said two pairs of slit jaws substantially independent of the magnitude of the deflection of said structure.

13. A slit mechanism as recited in claim 10, wherein said elastic, perimetral type structure has at least two thickened portions, with one of said slit jaws of each pair of coplanar slit jaws being associated with one of said thickened portions so that openings of constant width will be obtained when said elastic, perimetral type structure is deflected.

References Cited in the file of this patent

UNITED STATES PATENTS

| | | |
|---|---|---|
| 2,005,889 | Dillon et al. | June 25, 1935 |
| 2,096,964 | Frocht | Oct. 26, 1937 |
| 2,408,512 | Gradisar | Oct. 1, 1946 |
| 2,582,410 | Bergmann | Jan. 15, 1952 |
| 2,611,266 | Wiancko | Sept. 23, 1952 |
| 2,664,028 | Meyer et al. | Dec. 29, 1953 |
| 2,705,440 | George et al. | Apr. 5, 1955 |
| 2,730,007 | Chapman | Jan. 10, 1956 |
| 2,757,568 | Fastie | Aug. 7, 1956 |